3,712,949
INJECTABLE OXYTETRACYCLINE COMPOSITIONS
Sheldon B. Greenbaum, Livingston, and Kurt H. Schaaf, Morris Plains, N.J., and Howard C. Klein, Brooklyn, N.Y., assignors to Diamond Shamrock Corporation, Cleveland, Ohio
No Drawing. Continuation-in-part of abandoned application Ser. No. 807,121, Mar. 13, 1969. This application Feb. 4, 1970, Ser. No. 8,747
Int. Cl. A61k *21/00*
U.S. Cl. 424—227                                7 Claims

ABSTRACT OF THE DISCLOSURE

Injectable oxytetracycline compositions are prepared using glycerol formal as the solvent. The compositions have low viscosities at low temperatures and in addition have excellent stability of color, potency and clarity.

CROSS-REFERENCE TO RELATED APPLICATION

This application is a continuation-in-part of U.S. application Ser. No. 807,121—Greenbaum et al.—filed Mar. 13, 1969, now abandoned.

BACKGROUND OF THE INVENTION

This invention relates to injectable oxytetracycline compositions and more particularly to improved compositions having low viscosities at low temperatures and containing glycerol formal as a solvent.

Heretofore, preparations of oxytetracycline compositions suitable for injection have suffered from relatively high viscosities, poor stability and limited concentration of antibiotic. Such preparations have employed solvents such as propylene glycol, glycerol and polyethylene glycols as well as their mixtures with ethanol. High viscosities are particularly noticeable when injectable compositions containing polyhydric alcohols as solvents are used at low temperatures. Such high viscosities are often encountered when the compositions are used at the cool temperatures prevailing in barns, open feedlots or pastures. High viscosity compositions are objectionable because aspiration of a viscous composition into a hypodermic syringe and subsequent injection of the composition are both difficult and slow. Further, high viscosities also increase the time required to inject a large herd of animals. Other solvents may cause tissue irritation which is particularly undesirable in an animal as they may cause localized concentration of the antibiotic in the tissue and render the affected area undesirable for human consumption.

It is known according to East German Pat. No. 50,731 to prepare stable injectable oxytetracycline solutions by utilizing tetronic acid derivatives and/or their magnesium salts as solubilizing agents. This patent also discloses that the solubilizing power of the solubilizing agent can be enhanced and the amount of active ingredient increased when certain solvents such as glycerol formal are used. On the other hand, combinations containing glycerol formal without the solubilizing agents are unsuitable for preparing optimally active solutions. The two examples in this patent disclose a mole ratio of magnesium to oxytetracycline of approximately 3 to 1 and 4 to 1 respectively. It is also known that with a mole ratio of magnesium salt to oxytetracycline of 3 to 1, the antibiotic will precipitate out of solution. Hence, the addition of the solubilizer, namely, the tetronic acid derivatives, enhances solubility at these ratios. However, it has been found that this combination suffers from the disadvantage of high viscosity in the absence of large quantities of water. This is shown by a comparison of the viscosity data of Table II and of Example I of East German Pat. No. 50,731 appearing in Table VI. On the other hand, where large quantities of water are utilized in order to obtain desirable low viscosities, there is an accompanying sacrifice in stability. That is, accelerated aging tests showed a decided deterioration in appearance and potency.

It has been discovered that a mole ratio of magnesium salt to oxytetracycline of about 0.5 to about 2 moles per mole of oxytetracycline obviates the need for the solubilizers described in the aforementioned East German patent. It is now possible to eliminate the use of solubilizers and at the same time, reduce the viscosities of the compositions while still benefiting from the use of glycerol formal as a solvent. Also, the need for large quantities of water to control the viscosity is obviated. Further, the elimination of the solubilizer is itself very advantageous because the art is constantly striving to eliminate materials of unknown pharmacological activity.

It is an object of the present invention to provide improved injectable oxytetracycline compositions. A further object is to provide injectable oxytetracycline compositions in the form of solutions having lower viscosities at low temperatures and having excellent stability as to color, antibiotic potency and physical state. Another object is to provide injectable compositions having these desirable properties wherein only antibiotic, solvents, simple salts and antioxidants of recognized low toxicity are used. Still another object is to provide injectable antibiotic compositions having the above properties which contain a concentration of antibiotic of at least 5% (w./v.). A still further object is to provide injectable oxytetracycline compositions using glycerol formal as a solvent. Other objects of this invention will become apparent from the detailed description given herein. However, it is intended that the detailed description and specific examples do not limit this invention but merely indicate preferred embodiments.

SUMMARY OF THE INVENTION

The objects of this invention have been accomplished in the following manner. Injectable oxytetracycline compositions having lower viscosities at low temperatures have been prepared using oxytetracycline base or an oxytetracycline acid addition salt as the antibiotic, glycerol formal as solvent, water soluble magnesium salt, antioxidant, buffering agent and water. Thus, liquid compositions of an oxytetracycline antibiotic suitable for injection over a wide range of temperatures, particularly at low temperatures are provided for. The present invention also provides for injectable compositions having excellent characteristics such as stability of color, maintenance of potency and retention of physical clarity. Further, animals injected with the compositions are particularly free of irritation at the site of injection.

Liquid preparations of injectable oxytetracycline compositions on long standing, especially at elevated temperatures, tend to form small amounts of precipitated matter. This tendency appears to vary with the source of the oxytetracycline hydrochloride. Particulate matter in an injectable composition can cause clogging of hypodermic needles, inaccurate dosages, etc. This precipitated matter apparently arises from the presence of minute seeds acting as centers of nucleation. We have found that this tendency to form sediment can be eliminated by filtering the final preparation through an ultrafiltration device, preferably a membrane filter, said filter passing particles no larger than 1.0 micron and preferably removing all particles larger than 0.25 micron.

DESCRIPTION OF THE PREFERRED EMBODIMENTS

The relative proportions of constituents can be varied widely. For instance, a composition of oxytetracycline hydrochloride (oxytetracycline HCl) containing as much as 15 parts by weight of antibiotic can be prepared. The quantity of antibiotic such as oxytetracycline base or an acid addition salt thereof can vary from about 0.1 to about 15 parts by weight.

The proportion of a water soluble magnesium salt such as magnesium chloride hexahydrate ($MgCl_2 \cdot 6H_2O$) to oxytetracycline hydrochloride can be varied from about 0.5 to about 2 moles per mole of antibiotic, but preferably about 0.5 to about 1.5 moles per mole. Lower ratios tend to give deeper color on standing while higher ratios tend to give both deeper color and cause precipitation on standing. With higher quantities of antibiotic, the quantity of water soluble magnesium salt should be maintained near its lower range, e.g., 0.5 to 1.5 moles of magnesium salt per mole of antibiotic to avoid higher concentrations of magnesium salt which may adversely affect the viscosity.

The quantity of glycerol formal can vary from about 50 to about 95 parts by weight, the upper limit being regulated, of course, by the quantities of the other constituents. The quantity of water can be varied from none up to as much as about 45 parts by weight. Above 45 parts by weight of water, a turbid composition is formed. The persence of water is desirable to assist solution of the inorganics and to obtain an injectable composition which causes no visible tissue damage. Ethyl alcohol up to about 20 parts by weight can be substituted for part of the water or part of the glycerol formal in the composition to obtain a composition having even a lower viscosity.

An effective amount of an antioxidant is added. Sufficient buffering agent is added to provide a composition having a pH of from about 6 to about 9.5.

Glycerol formal, a condensation product of glycerol and formaldehyde prepared in accordance with the equation shown below, is obtained as a mixture of 4-hydroxymethyl-1,3-dioxolane (I) and 5-hydroxy-1,3-dioxane (II).

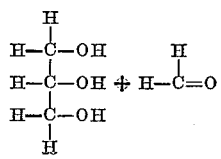

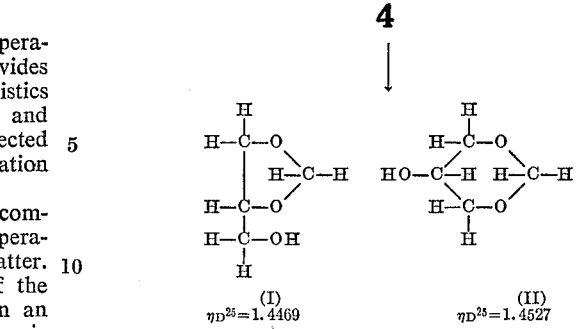

Tests show that glycerol formal produces no toxic effects or macroscopic pathology when 1500 mg./kg. is administered intraperitoneally to rats or 1000 mg./kg. is administered to mice or guinea pigs. See Sanderson, J. Pharmacy & Pharmacology 11, 150–156 (1959). Glycerol formal can be used as a mixture of 4-hydroxymethyl-1,3-dioxolane (I) and 5-hydroxy-1,3-dioxane (II) or the individual components can be separated and used per se. The two components in the mixture are not easily separated by distillation. However, they can be esterified first and the resulting esters then separated and hydrolyzed with alkali to recover the individual components.

Glycerol formal, the mixture obtained as the product of the reaction, or a mixture made by fortifying the product of the reaction with one of the components, or the individual components can be used in the present invention. Samples of injectable oxytetracycline compositions have been produced using various preparations of glycerol formal having various proportions of the isomers without observing any noticeable differences in stability or performance.

The solvent, glycerol formal as noted is a mixture of two entities, 4-hydroxymethyl-1,3-dioxolane (I) and 5-hydroxy-1,3-dioxane (II). The relative proportions of the two isomers vary somewhat according to the exact conditions of preparation and may be determined by reference to the index of refraction which varies with the composition. The applicability of the refractive index to determine the proportions of the two isomers has been confirmed. That is, one preparation was subjected to an isomer separation via the benzoate esters and the relative proportion of the two esters was found to be closely related to the value determined by the refractive index:

|  | Percent by weight | |
|---|---|---|
|  | Dioxolane | Dioxane |
| Refractive index method | 63.8 | 36.2 |
| Ester separation method | 59.2 | 37.2 |

Table I shows a number of physical properties of six glycerol formal preparations. Physical properties such as boiling point range, refractive index and the calculated percentages by weight of 4-hydroxymethyl-1,3-dioxolane (I) and 5-hydroxy-1,3-dioxane (II) based on the refractive index are shown as well as results obtained by the benzoate ester separation of one preparation.

TABLE I.—PHYSICAL PROPERTIES OF SIX GLYCEROL FORMAL PREPARATIONS

| Preparation No. | Boiling-point, °C./mm. | Refractive index, $\eta_D^{25}$ | Calculated composition, percent | |
|---|---|---|---|---|
|  |  |  | I | II |
| 1 | 75°/5 | 1.4498 | 50.0 | 50.0 |
| 2 | 90°/8 | 1.4500 | 46.6 | 53.4 |
| 3 | 95°/13 | 1.4496 | 53.6 | 46.4 |
| 4 [1] | 98°/15 | 1.4490 | 63.8 | 36.2 |
| 5 | 80°/11–88°/9 | 1.4497 | 51.7 | 48.3 |
| 6 | 80°–90°/10 | 1.4496 | 53.6 | 46.4 |

[1] Separation of preparation No. 4 via the benzoate esters gave—59.2% of I benzoate, B.P. 172–5° C./15 mm., or same as reported, and 37.7% of II benzoate in two crops of crystals melting at 75.5°–77° and 71°–73° C. respectively; reported: M.P. 72° C.

Any water soluble magnesium salt which is compatible with the oxytetracycline antibiotic in the composition, stable at the pH of the composition and physiologically acceptable, can be used in the compositions. Magnesium chloride and magnesium chloride hexahydrate are particularly useful. Other useful salts include magnesium acetate, magnesium sulfate, magnesium gluconate, magnesium glucoheptonate, magnesium phosphate and the like.

Antioxidants are used in addition to manufacturing and storing the compositions of this invention in an inert atmosphere. The antioxidants assist in the stabilization of the color and potency of the compositions. Any antioxidant which is physiologically acceptable for use in a parenteral drug composition and which is compatible with oxytetracycline can be used in the present invention. Suitable antioxidants include sodium bisulfite, sodium metabisulfite and sodium formaldehydesulfoxylate. Generally from about 0.05 to about 5 parts by weight of antioxidant are used.

An inert atmosphere such as nitrogen, helium or the like is not necessary for maintenance of potency, but aids considerably in the retention of a light colored composition on long storage.

The compositions of the present invention are prepared by mixing an oxytetracycline antibiotic, in its free base form (oxytetracycline base) or as an acid addition salt, with a water soluble magnesium salt in water or the glycerol formal solvent. When water is employed, the glycerol formal solvent is then added to the aqueous solution in appropriate quantity.

The pH of the composition is then adjusted to about 6.0 to about 9.5 with a buffering agent, e.g., physiologically acceptable bases such as sodium hydroxide, potassium carbonate, ammonia or physiologically acceptable lower aliphatic amines. These amines include ethanolamine (2-aminoethanol), diethylamine, ethylamine, triethanolamine, diethanolamine, arginine, glucosamine or the like. The final pH of the composition is ordinarily not critical, however, best stability appears to reside with moderate pH value, i.e., between about 6.0 to about 9.5. Lower pH values cause too rapid decomposition of the antioxidant while too high a pH increases color formation. Also when the final pH is above about 9.5, physiological compatibility of the composition with the muscle tissue is decreased. A final pH slightly on the alkaline side is preferred in order to minimize local tissue irritation on parenteral administration. The most satisfactory range is from about 6.0 to about 9.5, preferably from about 7.5 to about 8.5. Lower aliphatic primary, secondary and tertiary amines having up to about 6 carbon atoms per group attached to the amino nitrogen atom can be used as buffering agents.

For injection, the finished composition must be sterile. That is, terile components and sterile conditions of manufacture must be employed, or alternatively, the composition itself must be sterilized after manufacture such as by sterile filtration.

Regarding the selection of the antibiotic, oxytetracycline free base or an acid addition salt of same such as oxytetracycline hydrochloride, oxytetracycline phosphate, oxytetracycline sulfate, oxytetracycline acetate or the like can be used. Where a light colored final product is desired, a light colored antibiotic should be used.

For a fuller understanding of the nature and objects of this invention, reference may be made to the following examples. These examples are merely to illustrate the invention and are not to be construed in a limiting sense. All parts, proportions and quantities are by weight unless otherwise indicated. The terms g., % m./v., ml. ° C., ° F. μ are used to indicate grams, percent weight per volume, milliliters, degrees centigrade, degrees Fahrenheit and microns, respectively, in these examples.

EXAMPLE I

Preparation of glycerol formal 2,250 g. (24.45 moles) of glycerol was added to a flask equipped with a stirrer, thermometer, nitrogen inlet and reflux condenser. Then 750 g. (25.0 moles) of paraformaldehyde was added portionwise with stirring. When the solids were wetted with glycerol, 13.6 g. (0.07 mole) of p-toluenesulfonic acid monohydrate was added as a catalyst the mixture heated and stirred at 100° C. in a gentle stream of nitrogen for 2 hours.

The heat source was then removed and the water formed during reaction was distilled off in vacuo as the mixture cooled to room temperature. The aqueous distillate was reserved for subsequent processing. The green liquid reaction product remaining in the flask was heated to 100° C. and stirred overnight at this temperature under a nitrogen atmosphere.

The heat source was then removed and once more the water formed during reaction was distilled off in vacuo. The second aqueous distillate was also reserved for subsequent processing. The liquid remaining in the flask was distilled through a Claisen head, yileding a forerun, boiling at 32° C./21 mm. to 85° C./13 mm. Hg and a main fraction of crude glycerol formal distilling at 85° C./13 mm. to 85° C./9 mm. Hg. Only a negligble amount of brown liquid remained in the flask.

The combined aqueous distillates and forerun were concentrated atmospherically, using a small column. Concentration was continued until the distillate come over at 120° C. The residual colorless concentrate was added to the crude glycerol formal distillate obtained above. The resulting mixture was then fractionally distilled in vacuo using a small column. This gave in addition to a small forerun, 2422 g. glycerol formal, B.P. 80° C./10 mm.–90° C./10.5 mm. Hg, $n_D^{24.5}=1.4498$. The yield of glycerol formal was 95.3% of the theoretical. The product contained 50% by weight of 4-hydroxymethyl-1,3-dioxolane and 50% by weight of 5-hydroxy-1,3-dioxane. It was stored under nitrogen.

EXAMPLE II

Compositions A through G shown in Table II were prepared in accordance with the following procedure. Of these, Compositions A & B contained glycerol formal prepared by the method of Example I. All compositions were prepared in a nitrogen atmosphere.

In each preparation, 10.28 parts by weight of oxytetracycline HCl was first dissolved in 38.3 parts by weight of distilled water. Then 3.01 parts by weight of MgCl·6H$_2$O was dissolved in the aqueous oxytetracycline solution and the resulting solution adjusted to a pH of 7.5.[1] Sodium formaldehydesulfoxylate was added as an antioxidant to each solution and the solution diluted and stirred with the indicated quantities of the particular solvent. After complete solution of the ingredients, sufficient 2-aminoethanol was added to adjust the final pH of the composition to 8.

Kinematic viscosities of each composition were determined at 5° C., 15° C. and 25° C. in a Cannon-Fenske viscosimeter calibrated with standardized oils supplied by the National Bureau of Standards.

Data in Table II show that Compositions A and B, which are within the scope of the present invention, have the desired low viscosities whereas Compositions C through G, which are outside the scope of the present invention, have substantially higher viscosities. The low viscosities are particularly notable at low temperatures.

It may be noted that Composition A in Table II had a density of 120 at 20° C. The concentration of oxytetracycline HCl was 4.37% by weight or 5.24% w./v.

---

[1] The mole ratio of magnesium to oxytetracycline HCl was 0.72 to 1.

TABLE II.—INJECTABLE OXYTETRACYCLINE HCl COMPOSITIONS

| | Parts by weight | | | | | | |
|---|---|---|---|---|---|---|---|
| | A | B | C | D | E | F | G |
| Ingredients: | | | | | | | |
| Oxytetracycline-HCl | 10.28 | 10.28 | 10.28 | 10.28 | 10.28 | 10.28 | 10.28 |
| $MgCl_2 \cdot 6H_2O$ | 3.01 | 3.01 | 3.01 | 3.01 | 3.01 | 3.01 | 3.01 |
| 2-aminoethanol [1] | 4.6 | 4.8 | 4.5 | 4.7 | 4.5 | 4.2 | 4.4 |
| Sodium formaldehyde-sulfoxylate | 1.13 | 1.13 | 1.13 | 1.13 | 1.13 | 1.13 | 1.13 |
| $H_2O$ | 38.3 | 38.3 | 38.3 | 38.3 | 38.3 | 38.3 | 38.3 |
| Glycerol formal | 177.3 | 132.0 | | | | | |
| Propylene glycol | | | 151.0 | 111.6 | | | |
| Glycerol | | | | | 183.0 | | |
| Polyethylene glycol 400 | | | | | | 167.9 | 124.7 |
| Absolute ethanol | | 39.2 | | 39.2 | | | 39.2 |
| Kinematic viscosities in centistokes of injectable oxytetracycline compositions | | | | | | | |
| At 5° C | 16.9 | 14.2 | 59.6 | 33.0 | Gel [2] | 301 | 76.9 |
| At 15° C | 11.7 | 7.7 | 35.0 | 17.9 | Gel [2] | 141 | 52.8 |
| At 25° C | 7.7 | 5.5 | 19.0 | 11.1 | Gel [2] | 74.5 | 25.6 |

[1] Small differences are the results of pH adjustments.
[2] Not suitable for injection.

EXAMPLE III

An oxytetracycline composition was prepared as in Example II–A using 11.25 parts by weight of oxytetracycline HCl (NF), 3.44 parts by weight $MgCl_2 \cdot 6H_2O$ and maintaining the same parts by weight of the other constituents.[1] This composition had a density of 1.20 at 20° C., a weight percentage of 4.75, and a w./v. percentage of 5.7 of 95% material. Samples of compositions prepared in this manner were used in Examples IV through X.

EXAMPLE IV

The following experiments compare ease of hypodermic syringe delivery of an injectable oxytetracycline composition with in the scope of the present invention with commercial composition outside the scope of the present invention.

50 cc. samples of the injectable oxytetracycline composition of Example III, which is within the scope of this invention, and a commerical composition of comparable activity, which contained propylene glycol as the solvent in approximately the same proportion as glycerol formal and which is outside the scope of this invention, were stored at 35.6° F. Additional 50 cc. samples of both compositions were stored at 72° F. After 24 hours of storage at the above temperatures, 10 cc. portions of each sample were aspirated using 10 cc. disposable hypodermic syringes (BD-Becton Dickinson & Co.) equipped with 18 gauge 2 inch needles and then injected into rubber capped Vacutainer vacuum tubes without touching the plungers. That is, the syringes were allowed to empty by vacuum suction into the tubes. Times required to empty the syringes were recorded by stop watch. Both aspirations and injections were made at the temperature at which the particular sample was stored, that is, at 35.6° F. or 72° F. These temperautres simulate use conditions, that is, 35.6° F. would be comparable to a cold drafty barn and 72° F. would be comparable to room temperature. Results of these tests are shown below.

| Source of composition | Temperature of test, ° F. | Time in seconds to empty a filled 10 cc. syringe |
|---|---|---|
| Example III | 72 | 7 |
| | 35.6 | 11 |
| Commercial | 72 | 12 |
| | 35.6 | 28 [1] |

[1] Aspiration of the commercial composition from sample bottle at this temperature was very difficult due to high viscosity. It was difficult to fill the syringe from the ampule containing the preparation.

These experiments further demonstrate the advantages of the injectable oxytetracycline composition of Example III, which is within the scope of this invention and the disadvantages of a typical commercial composition outside the scope of this invention.

EXAMPLE V

An oxytetracycline composition prepared as in Example III was filtered through a membrane filter passing only particles smaller than 0.22 microns-(Millipore GS 22) and vialed in 100 ml. glass injection vials under nitrogen. The vials were stored at 25° C. (room temperature), 37° C. and 45° C. for 7 weeks. (Four weeks storage at 45° C. is regarded as the equivalent of one year of storage at 25° C.) At the end of the seven week period, there was no significant difference in potency, no apparent color change and no formation of particulate matter.

Millipore filters are manufactured by the Millipore Corporation, Bedford, Mass. Similar filters are produced by the Sartorius Division of Brinkmann Instrument Company, Westbury, N.Y.

EXAMPLE VI

An oxytetracycline composition prepared as in Example III was filtered through a membrane ultrafilter passing only particles smaller than 0.22 microns (Millipore GS 22). An identical composition containing oxytetracyline of the same manufacture was filtered instead through an ordinary sintered glass filter covered with a layer of filter aid (Supercel) and stored in a glass vial. After 90 days of storage at 45° C., the composition which was filtered through the sintered glass filter contained a small precipitate observable by swirling the vial, while the composition which had been filtered through the membrane filter was perfectly clear, thus demonstrating the efficacy of an ultrafilter in maintaining clarity.

EXAMPLE VII

Samples of an oxytetracycline injectable composition prepared as in Example III were vialed under nitrogen and stored at 25° C., 37° C., and 45° C. respectively. Each sample was assayed and its color determined at regular intervals. Results of these tests are given in Table III and show little if any change in activity and no change in color after storage at these temperatures indicating the composition has outstanding potency and color stability.

TABLE III.—STORAGE OF AN OXYTETRACYCLINE COMPOSITION AT 25° C., 37° C. AND 45° C.

| Weeks storage | 25° C. | | 37° C. | | 45° C. | |
|---|---|---|---|---|---|---|
| | Color [1] | Assay [2] | Color [1] | Assay [2] | Color [1] | Assay [2] |
| 0 | G | 5.8 | G | 5.4 | G | 5.6 |
| 14 | G | 5.6 | G | 5.6 | G | 5.5 |
| 27 | G | 5.5 | G | 5.6 | G | 5.7 |

[1] G is the original golden yellow color.
[2] Average of two determinations (A.O.A.C. Method).

EXAMPLE VIII

The compositions shown in Table IV were prepared as in Example III or from a concentrate (Composition K) diluted with water and glycerol formal. Compositions were clear solutions except for Composition N which formed a hazy suspension, indicating that compositions containing up to about 45 parts by weight of water have satisfactory properties.

TABLE IV.—OXYTETRACYCLINE INJECTABLE COMPOSITIONS

| Composition | J | K | L | M | N |
|---|---|---|---|---|---|
| Parts by weight: | | | | | |
| Oxytetracycline HCl | 4.57 | 15.16 | 4.76 | 4.77 | 4.75 |
| $H_2O$ | 3.90 | 12.94 | 8.11 | 32.45 | 45.80 |
| Glycerol formal | 87.74 | 59.74 | 83.31 | 58.95 | 45.63 |
| 2-aminoethanol | 1.93 | 6.00 | 1.88 | 1.89 | 1.88 |
| $MgCl_2 \cdot 6H_2O$ | 1.40 | 4.64 | 1.46 | 1.46 | 1.46 |
| Sodium formaldehyde sulfoxylate | 0.46 | 1.52 | 0.48 | 0.48 | 0.48 |
| Mole ratio of Mg to oxytetracycline HCl | 0.76 | 0.80 | 0.75 | 0.75 | 0.76 |

EXAMPLE IX

The following case histories demonstrate treatments of animals with injectable oxytetracycline compositions within the scope of the present invention.

Case history (1).—This was a case of acute mastitis involving all four quarters of a Holstein cow showing rapid onset, marked mammary swelling, and slightly elevated temperature. The animal was injected intramuscularly with 20 cc. of injectable oxytetracycline composition, prepared as in Example III and filtered through a Millipore filter. The cow completely recovered (disappearance of above symptoms) within 24 hours. In the absence of treatment, the rapid development of acute mastitis terminates in severe irreversible toxemia due to coliform organisms (most common cause of acute mastitis).

Case histaory (2).—This was a case of acute mastitis complicated by a teat injury in a Holstein cow, showing marked mammary swelling, rapid onset, and superficial lacerations on teats of RF (right front) and LF (left front) quarters due to faulty milking equipment. The animal was injected intramuscularly with 20 cc. of injectable oxytetracycline composition, prepared as in Example III and filtered through a Millipore filter. Noticeable improvement was recorded after 24 hours when a second similar 20 cc. injection of the same formulation was made. There was complete recovery after the second treatment. In the absence of treatment, the superficial wounds can become severly infected thus complicating an already established acute mammary infection.

Case history (3).—This case involved an acute respiratory infection in a Holstein cow, manifested by congestion of the visible mucous membrane, anorexia, diminished milk flow and a dry, painful cough. Temperature was 102° F. The animal was intramuscularly injected with 20 cc. of injectable oxytetracycline prepared as in Example III and filtered through a Millipore filter. The cow completely recovered within 24 hours (return to normal appetite and disappearance of visible nasal mucous membrane symptoms). In the absence of treatment, this bacterial infection can lead to serious viral pneumonia with fatal or uneconomic termination.

Case history (4).—Approximately 250 head of cattle were given intramuscular injections of an injectable oxytetracycline composition, prepared as in Example III and filtered through a Millipore filter. The injections were used to treat shipping fever, bacterial pneumonia, foot-rot and bacterial enteritis. It is a common practice to inject all small cattle coming from the farm to feedlots with a broad-spectrum antibiotic such as oxytetracycline. In the absence of treatment, based on experience, mortality losses can run as high as 20%. None of the treated cattle died showing the efficacy of the composition. The composition exhibited lower viscosities at low temperatures than comparable commercial products and had improved handling properties.

EXAMPLE X

Each of three dairy cows received a single 30 cc. injection of the injectable oxytetracycline composition of Example III filtered through a Millipore filter. The total amount of antibiotic injected was about 1.5 g. oxytetracycline hydrochloride per cow. Approximately 35 cc. samples of blood were taken from each cow at 0, 1.5, 2, 4, 6, 8, 12, 24, 48 and 72 hours after injection and approximately 35 cc. samples of milk were taken from each cow after 8, 12, 24, 48 and 72 hours after injection and analyzed for oxytetracycline hydrochloride (gamma/ml.). Oxytetracycline hydrochloride in the blood sample was analyzed by the procedure given in "Information From Assay and Reporting of Data Pertaining to Antibiotic Residues in Milk, Dairy Products and Animal Tissues," Dept. of HEW, FDA, Bureau of Science, Rev. of January 1967, and oxytetracycline hydrochloride in the milk sample was analyzed by the procedure given in the same manual. Results of the analyses of these samples in Table V demonstrate that the composition provided satisfactory oxytetracycline hydrochloride levels in the blood and milk of the three cows after a single intramuscular injection. Levels of oxytetracycline in the blood and milk were comparable to those obtained with a commercial oxytetracycline parenteral composition of the same activity. No unusal clinical reactions were observed in the three lactating cows after intramuscular injection of the composition.

TABLE V.—SUMMARY OF BLOOD AND MILK DATA OBTAINED FROM DIARY COW STUDY WITH INJECTABLE OXYTETRACYCLINE COMPOSITION OF EXAMPLE III

| Elapsed time after injection when samples were taken (hours) | Blood (gamma/ml.) | | | | (Milk (gamma/ml.) | | | |
|---|---|---|---|---|---|---|---|---|
| | Cow | | | | Cow | | | |
| | #A | #B | #C | Avg. | #A | #B | #C | Avg. |
| 0 | None | None | None | None | None | None | None | None |
| 1 | 1.10 | 1.70 | 1.30 | 1.37 | None | None | None | None |
| 1.5 | 1.54 | 1.68 | 1.40 | 1.54 | None | None | None | None |
| 2 | 1.48 | 1.58 | 1.42 | 1.49 | None | None | None | None |
| 4 | 1.62 | 1.71 | 1.58 | 1.64 | None | None | None | None |
| 8 | 1.96 | 1.76 | 1.79 | 1.84 | 0.46 | 0.41 | 0.51 | 0.46 |
| 12 | 1.35 | 1.38 | 1.29 | 1.34 | 0.52 | 0.74 | 0.67 | 0.64 |
| 24 | 0.54 | 0.63 | 0.54 | 0.57 | 0.56 | 0.44 | 0.54 | 0.51 |
| 48 | 0.20 | 0.16 | 0.28 | 0.21 | None | None | None | None |
| 72 | None | None | None | None | None | None | None | None |

EXAMPLE XI

In this example, 4-hydroxymethyl-1,3-dioxolane (Hibbert and Carter, J. Amer. Chem. Soc. 50; 3120 [1928]) was used in the preparation of the oxytetracycline composition. This dioxolane had a boiling point of 81–85° C./ 11 mm. and $n_D^{25}$ 1.4468.

A 10.28 g. portion of oxytetracycline hydrochloride and 38.3 ml. of distilled water were charged into a nitrogen-flushed 500 ml. flask and stirred in a gentle nitrogen stream for ¼ hour, yielding a hazy, dark-yellow solution. 4-hydroxymethyl-1,3-dioxolane (38.3 g.) was added and stirring continued for ¼ hour. Then 3.01 g. (0.75 molar equivalent) of reagent-grade $MgCl_2 \cdot 6H_2O$ was added and dissolved with stirring for ¼ hour. The mole ratio of magnesium to oxytetracycline HCl was 0.72 to 1. The solution was adjusted to pH 8.5 from pH 1.3 by adding dropwise 4.05 ml. of 2-aminoethanol, during which time a transient dark yellow slurry was formed, changing to an amber solution. After stirring for ¼ hour, 1.13 g. of pharmaceutical grade sodium formaldehydesulfoxylate was added and dissolved with stirring for ¼ hour. Finally, 139.0 g. of 4-hydroxymethyl-1,3-dioxolane was added, and the mixture stirred overnight with the occasional addition of small portions of 2-aminoethanol for maintenance of pH. The final, clear amber solution had a volume of 198 ml. and a density of 1.189 at 25° C.

Using the method Example II, the kinematic viscosities in centistokes at 5° C., 15° C. and 25° C. (average of two measurements) were 13.1, 9.8 and 7.1 respectively.

EXAMPLE XII

In this example, 5-hydroxy-1,3-dioxane (Hibbert and Cater, J. Amer. Chem. Soc. 50; 3120 [1928]), was used as the solvent in the preparation of the oxytetracycline composition. The dioxane had a boiling point of 81.5–82° C./11 mm. and $n_D^{25}$ 1.4527.

This formulation was prepared in the same manner as Example XI, except that 177.3 g. of 5-hydroxy-1,3-dioxane was employed as the non-aqueous solvent. The final density was 1.208 at 25° C.

Using the method of Example II, the kinematic viscosities of the finished product in centistokes at 5° C., 15° C. and 25° C. (average of two measurements) were 21.8, 14.2 and 10.4 respectively.

EXAMPLE XIII

In this example, the two examples of East German Pat. No. 50,731 were repeated.

The 3-benzyltetronic acid was prepared by standard procedures and had a melting point (169–170° C.) comparable to that recorded in the literature. (Reichert and Schafter, Archiv der Pharmazie 291, 100 (1958), M.P. 167.5° C.). The magnesium salt of 3-benzyltetronic acid was prepared by heating the 3-benzyltetronic acid with 0.5 molar equivalent of magnesium oxide in water and evaporating the filtered solution (percent Mg, found 5.7; caculated 6.0).

The composition of the glycerol formal was 61% by weight 4-hydroxymethyl-1,3-dioxolane and 39% by weight 5-hydroxyl-1,3-dioxane.

EXAMPLE 1 OF EAST GERMAN PAT. NO. 50,731

Eight grams of 3-benzyltetronic acid were dissolved in 60 ml. of glycerol formal with heating and stirring. The solution was treated with 0.8 g. of sodium formaldehydesulfoxylate and 8.0 g. of magnesium chloride hexahydrate. 6.0 g. of oxytetracycline base was added portionwise with stirring. The mole ratio of magnesium to oxytetracycline base was 3.01 to 1. The pH of the mixture was adjusted to 7.2 with ethanolamine. Total solution volume was adjusted to 100 ml. with glycerol formal. After filtration, the solution was drawn off under an inert gas. Portions of the solution were vialed under nitrogen and stored at 45° C. for 26 weeks. After this period of time, the solutions were examined visually. There was no apparent color change.

EXAMPLE 2 OF GERMAN PAT. NO. 50,731

Eleven and two-tenths grams magnesium 3-benzyltetronate, 1.6 g. sodium formaldehydesulfoxylate, 12.0 g. magnesium chloride hexahydrate and 10.0 oxytetracycline base were successively dissolved with stirring in 60 ml. of a 50% by weight aqueous glycerol formal solution. The mole ratio of magnesium to tetracycline base was 5.48 to 1. The solution was adjusted to pH 7.2 with aqueous ethanolamine, diluted with 50% by weight aqueous glycerol formal solution to 100 ml., filtered and drawn off under an inert gas. Portions of the solution were vialed under nitrogen and stored at 45° C. for 26 weeks. After this period of time, the solutions were examined visually for color change. The solutions had turned black with evidence of formation of oily insoluble globules. These solutions were not acceptable for veterinary applications, i.e., solutions that subsequently discolor and produce insolubles are not acceptable to veterinary practitioners.

Further, by microbiological assay, aging was apparently accompanied by a substantial reduction of activity.

The kinematic viscosity of the compositions produced according to Examples 1 and 2 of East German Pat. No. 50,731 was determined using the method described in Example II above. The data obtained is set forth in Table VI below.

TABLE VI.—EAST GERMAN 50,731 KINEMATIC VISCOSITY IN CENTISTOKES

|  | 5° C. | 15° C. | 25° C. |
| --- | --- | --- | --- |
| Example 1 | 191.68 | 101.72 | 72.43 |
| Example 2 | 22.64 | 15.34 | 10.52 |

As can be seen by a comparison of the above data with the viscosity data appearing in Table II and in Example XI, the viscosities of the compositions of the present invention are considerably lower than those of East German Pat. No. 50,731. Where the viscosity of compositions of East German Pat. No. 50,731 is low (see viscosity of Example 2 of this patent as reported in Table VI above), this is achieved by dilution with large quantities of water, but is accompanied by a substantial sacrifice in appearance. That is, on accelerated aging the solution turned black and oily insoluble globules were present. Also, aging was apparently accompanied by a substantial reduction of activity.

What is claimed is:

1. A stable, injectable antibiotic composition for parenteral administration having low viscosity at low temperatures and having stability of color, potency and clarity comprising
    (a) from about 0.1 to about 15 parts by weight of an antibiotic selected from the group consisting of oxytetracycline base and an acid addition salt thereof
    (b) a water soluble magnesium salt present in a molar ratio from about 0.5 to about 2 moles per mole of said antibiotic,
    (c) from about 50 to about 95 parts by weight of glycerol formal selected from the group consisting of 4-hydroxymethyl-1,3-dioxolane, 5-hydroxy-1,3-dioxane and mixtures thereof,
    (d) from 0 to about 45 parts by weight of water,
    (e) an antioxidant in an amount sufficient to stabilize said composition, and
    (f) a buffering agent in an amount sufficient to provide a pH of from about 6 to about 9.5 in said composition.

2. The composition of claim 1 wherein said antibiotic is oxytetracycline hydrochloride, said magnesium salt is magnesium chloride hexahydrate and said glycerol formal is a mixture of 4-hydroxymethyl-1,3-dioxolane and 5-hydroxy-1,3-dioxane.

3. The composition of claim 1 wherein the molar ratio of said magnesium salt to said antibiotic is about 0.5 to about 1.5 moles per mole of said antibiotic.

4. The composition of claim 1 wherein said antioxidant is sodium formaldehydesulfoxylate.

5. The composition of claim 1 wherein said buffering agent is 2-aminoethanol.

6. The composition of claim 1 wherein substantially all particles thereof are smaller than 0.22 microns.

7. In a vial the antibiotic composition of claim 1 enveloped in an inert gas.

References Cited

UNITED STATES PATENTS 2,990,331   6/1961   Neumann et al. _____ 424—227
3,128,227   4/1964   Kanegis et al. _____ 424—227

ALBERT T. MEYERS, Primary Examiner

D. M. STEPHENS, Assistant Examiner

UNITED STATES PATENT AND TRADEMARK OFFICE
CERTIFICATE OF CORRECTION

PATENT NO. : 3,712,949
DATED : January 23, 1973
INVENTOR(S) : Sheldon B. Greenbaum, Kurt H. Schaaf and Howard C. Klein It is certified that error appears in the above-identified patent and that said Letters Patent are hereby corrected as shown below:

Column 5, line 55, "terile" should be --sterile--; Column 5, line 72, "m./v." should be --w./v.--. Column 6, line 31, "come" should be --came--; Column 6, line 52, "MgCl" should be --$MgCl_2$--; Column 6, line 71, "120" should be --1.20--. Column 7, the following footnote should be inserted at the end of Example IV --The mole ratio of magnesium to oxytetracycline HCl was 0.72 to 1--; Column 7, line 35, "with in" should be --within--; Column 7, line 56, "temperautres" should be --temperatures--. Column 11, line 5, after "method" insert --of--.

Signed and Sealed this

Fifteenth Day of February 1977

[SEAL]

Attest:

RUTH C. MASON
*Attesting Officer*

C. MARSHALL DANN
*Commissioner of Patents and Trademarks*